United States Patent

[11] 3,569,664

| [72] | Inventors | Richard A. A. Newman;<br>Brian C. Doxey, Welwyn, Hertfordshire<br>London, England |
|---|---|---|
| [21] | Appl. No. | 657,104 |
| [22] | Filed | July 31, 1967 |
| [45] | Patented | Mar. 9, 1971 |
| [73] | Assignee | The British Oxygen Company Limited<br>London, England |
| [32] | Priority | Aug. 9, 1966 |
| [33] | | Great Britain |
| [31] | | 35603/66 |

[54] WELDING POWER SOURCES
8 Claims, 3 Drawing Figs.

[52] U.S. Cl. .......................................................... 219/131
[51] Int. Cl. ............................................................ B23k 9/10
[50] Field of Search ............................................. 219/131,
131 (R), 135, 130; 307/131, 132, 11

[56] References Cited
UNITED STATES PATENTS

| 2,003,056 | 5/1935 | Southgate.................... | 219/134X |
| 2,556,715 | 6/1951 | Vigars.......................... | 307/32X |
| 3,102,976 | 9/1963 | Blair............................. | 219/131X |
| 3,324,379 | 6/1967 | Mulder......................... | 219/131X |
| 3,339,107 | 8/1967 | Aldenhoff..................... | 219/131X |

*Primary Examiner*—Joseph V. Truhe
*Assistant Examiner*—J. G. Smith
*Attorney*—Townshend & Meserole ABSTRACT: A power source for electric welding equipment comprising a central current source and two or more remote operator sets, has at the central source at least one half-wave rectifier which is common to all the remote operator sets.

A second rectifier is provided for each of the operator sets which include a power control means for individually controlling the power to each of the operator sets. The combined first and second rectifiers provide full-wave rectification with each individual combination of first and second rectifiers having a power capability different than the individual power capability of each of the other rectifier combinations.

INVENTORS
RICHARD A. A. NEWMAN
BRIAN C. DOXEY
BY Townsend & Meserole
ATTORNEYS

WELDING POWER SOURCES

BACKGROUND OF THE INVENTION

This invention relates to welding power sources, and particularly to multioperator power sources for direct current welding.

Several distinct types of equipment are used for multioperator power sources for DC welding but they all have one or more disadvantages. It is an object of the present invention to provide a power source which is adapted to supply direct current from an AC supply with a desired characteristic curve.

SUMMARY OF THE INVENTION

The present invention provides a power source intended to supply several semiautomatic welding sets with power having the requisite substantially flat current/voltage characteristics, the voltage available at each set being independently adjustable.

BRIEF DESCRIPTION OF THE DRAWINGS

Three embodiments of the invention will now be described by way of example with references to the accompanying diagrammatic circuit diagrams, in in which:

Referring to FIG. 1, two welding torches 1 and 2 are arranged to be supplied in parallel with direct current by rectification of the output from star-connected secondary windings 3, 4 and 5 of a 3-phase transformer 6. Each of the windings is connected through a bus bar 7, 8 or 9, to a thyristor 10, 11 or 12 for welding torch 1, and to a thyristor 13, 14 or 15 for welding torch 2. A common line 16 or 17 is taken from each of these groups of thyristors to the appropriate welding torch. The return leads 18 and 19 for the welding current are connected to a bus bar 20, which is connected to each of the secondary windings 3, 4 and 5 by diode rectifiers 21, 22 and 23.

Figure 1:
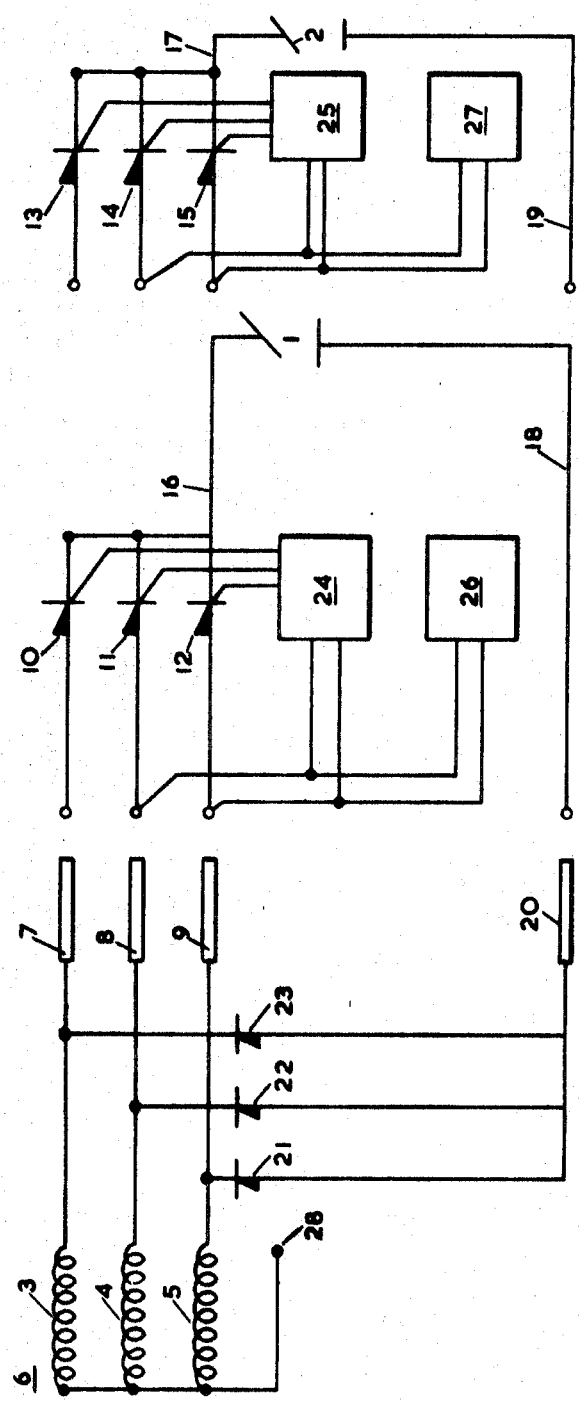
FIG. 1 shows the central unit and two operator units of a 3-phase multioperator power source.

A control unit 24 is provided for use by the operator of welding torch 1, and a similar control unit 25 for welding torch 2. The control units are each connected to the gates of the thyristors 10, 11, and 12, or 13, 14 and 15, and to the two bus bars 8 and 9. The control units operate in known manner to vary that proportion of the respective half-cycle over which the thyristor is conductive, and hence the voltage of the welding current flowing through it. It will be noted that the direct welding current for welding torches 1 and 2 is independently controlled by the control units 24 and 25. The return current from both welding torches does however flow through the diode rectifiers 21, 22 and 23 which are common to both operator sets, and through rectifiers 10, 11 and 12 for welding torch 1, and rectifiers 13, 14 and 15 for torch 2.

A further tapping from bus bars 8 and 9 is taken to provide operating voltage for ancillary equipment 26 and 27 used by the two operators. This ancillary equipment may for example include the wire feed mechanism of a consumable-electrode, inert gas-shielded electric welder otherwise known as MIG equipment.

The three thyristors, control unit and power supply for the ancillary equipment provided for each welding arc constitute an operator unit, and it will be appreciated that more than two operator units may be connected to the control unit where the equipment ratings permit. The control unit is constituted by transformer 6 and the diode rectifiers 21, 22 and 23. The operator units may be disposed remotely from the control unit in the vicinity of the respective welding torches, the connections between them being made by plug-and-socket couplings to the bus bars shown, or by distribution boxes.

The system shown in FIG. 1 is particularly suitable for providing to two or more welding torches a direct current supply of relatively flat voltage-current characteristics. MIG welding using either solid or flux-cored electrode wires, may be carried out with this power source. A welding current smoothing circuit, or a choke to control the amount of weld spatter, may be included as necessary. A welding contactor may also be included, or alternatively the switching characteristics of the thyristors can be utilized to prevent flow of welding current except when required. The thyristors can also limit the current flowing when a short circuit occurs at the welding torch.

By use of a star connection for the secondary windings of the transformer 6 a neutral point is made available, and this can be utilized to provide a heavy direct current for other applications, for example for cathodic protection in a shipyard, using common bus bar 20 and a connection 28 to the neutral point.

Several modifications are possible. For example some of the components disposed in each operator unit as described above may alternatively be located at the control unit. Thus the thyristors 10, 11 and 12 for welding torch 1 may be located near to the transformer 1, so that only the direct welding current flows through the cables extending to the operator unit. The control unit and ancillary equipment supply will still be located in the operator unit.

In addition the output voltage of the thyristors may be stabilized by any suitable means against variations due to fluctuations in the main supply voltage, variable loads applied by other operators, voltage drops in the supply cables, or like causes.

As a further alternative the transformer 6 shown in FIG. 1 is replaced by a 3-phase alternator.

Figure 2:
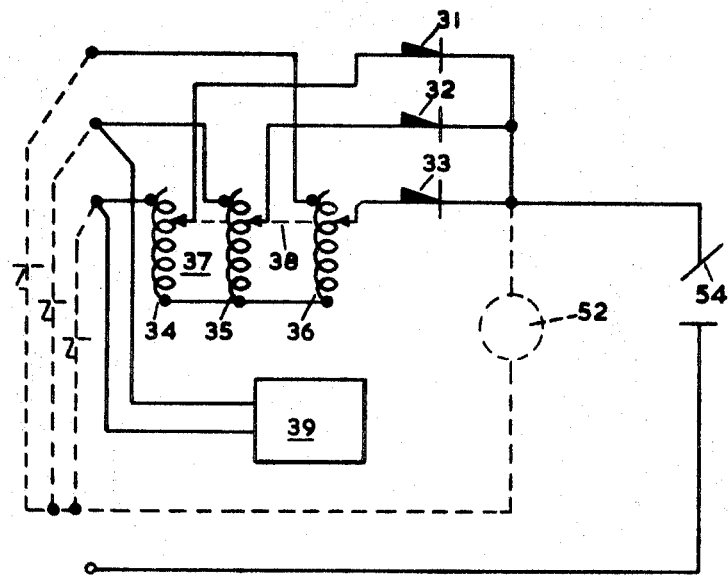
FIG. 2 shows an alternative operator unit.

According to another modification which is shown in FIG. 2, an operator unit includes diode rectifiers 31, 32 and 33 connected one to each phase line, and the voltage applied to each diode is derived from a respective winding 34, 35 or 36 of a 3-windings autotransformer 37 having a ganged movable tap 38. Control of the output voltage-current characteristic may be obtained by adjustment of the tap 38. Provided that the autotransformer is sufficiently limited in its range of control, its size and weight may be considerably smaller, and therefore the unit may be more portable, than that of a single operator transformer. Furthermore a separate winding may be provided on the autotransformer to supply ancillary equipment 39, such as a wire feed motor, at the input voltage as opposed to the autotransformer output voltage which is determined by the welding process to be used.

A feature to be noted with the power source of FIGS. 1 and 2 is that both alternating voltage and direct voltage are available at the operator unit. Control of the output current is therefore possible either in the AC or DC circuits. Thus an adjustable inductor may be provided in the AC circuit, or an adjustable resistor in the DC circuit, as an alternative to the thyristor control shown in FIG. 1. Different methods of output control may be used for different rectifiers of a single power source. Thus one welding torch may be supplied by an operator unit as shown in FIG. 1 for spray transfer MIG welding, with the operator set being adjusted to give a substantially flat characteristic, and at the same time another welding torch 54 may be supplied by an operator unit as shown in FIG. 2 for manual welding with a rod electrode, the output voltage-current characteristic for the second torch being drooping.

Control units to suit specific welding methods and with a limited range of control may be provided. For short-circuited welding, or dip transfer, for example, the control unit may include an inductance to limit the rate of rise of current on short circuit. For pulsed arc welding, for example, a circuit element such as a resistor may be arranged to attenuate alternate cycles of a single-phase supply, or two phases of a 3-phase supply.

Where thyristor control is used it may be necessary to provide additional means to provide arc-sustaining current when the thyristors are not conducting.

Figure 3:
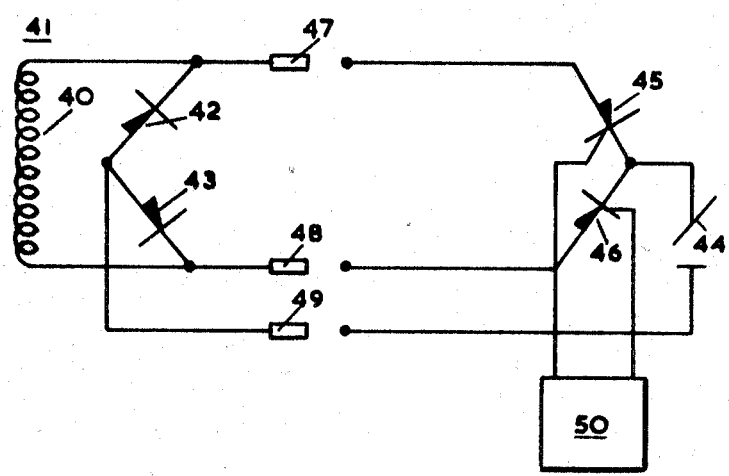
FIG. 3 shows a central unit and a single operator unit of a single-phase multioperator power source.

In FIG. 3 is shown an adaptation to a single-phase power source of the system of FIG. 1. Referring to FIG. 3 the control unit comprises a secondary winding 40 of a single-phase transformer 41, and diode rectifiers 42 and 43 connected across winding 40. The operator unit for one welding torch 44 includes thyristors 45 and 46 connected to rectifiers 42 and 43 by bus bars 47 and 48. The welding current return connection is made by way of bus bar 49. A control unit 50 is provided to control conduction of the thyristors 45 and 46. Means such as smoothing capacitors in the output circuit may be needed to prevent extinguishing of the welding arc as its voltage passes through zero. The operator unit for a second welding torch is similar to that described.

It might be desirable to provide at each operator set a voltmeter of ammeter or both to assist the operator to adjust his set. One manner in which a voltmeter 52 can be connected is shown in broken lines in FIG. 2.

Although it does not in itself form part of the subject matter of the present invention a supply of arc-shielding gas common to all the operators may be provided.

We claim:

1. An electric arc welding system comprising, in combination: a plurality of operator sets each including a welding torch; a central source of alternating current; electrical paths from said source to said sets; a first half-wave rectifier in each individual path from the alternating current source to each welding torch; a ground return electrical path from each torch to the alternating current source; a second half-wave rectifier in said ground return path and common to said operator sets; a separate power control means individual to each operator set; the combined first and second half-wave rectifiers in the complete electrical path of each operator set providing full-wave rectification for the power control means of their associated set, and each individual combination of first and second rectifiers having a power capability different than the individual power capability of each of the other rectifier combinations.

2. The source claimed in claim 1, in which the first rectifier is a thyristor of which the gate electrode is connected to a firing control circuit.

3. The source claimed in claim 1, in which the first rectifier is a diode rectifier.

4. The source claimed in claim 3, in which the voltage adjusting means is an autotransformer.

5. The source claimed in claim 1, in which the first rectifier combines with the second rectifier to form a full-wave rectifier bridge.

6. The source claimed in claim 1, in which the power source is polyphase, the output from the first rectifiers being combined before passing to the respective torch.

7. The source claimed in claim 1, in which operator set includes means for controlling the rate of supply of consumable electrode to the respective welding torch.

8. The source claimed in claim 6, in which the central source includes three star-connected windings each connected to a bus bar adapted to be connected to a respective conductor on each respective operator set, and in which the neutral point of the winding is connected to a terminal.